US008465714B2

(12) United States Patent
Augustine

(10) Patent No.: US 8,465,714 B2
(45) Date of Patent: *Jun. 18, 2013

(54) CATALYST PROMOTERS IN VANADIUM-FREE MOBILE CATALYST

(75) Inventor: Steven M. Augustine, Ellicott City, MD (US)

(73) Assignee: Cristal USA Inc., Hunt Valley, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/406,098

(22) Filed: Feb. 27, 2012

(65) Prior Publication Data

US 2012/0164047 A1 Jun. 28, 2012

Related U.S. Application Data

(63) Continuation of application No. 12/468,461, filed on May 19, 2009, now Pat. No. 8,148,295, which is a continuation-in-part of application No. 12/371,760, filed on Feb. 16, 2009, now Pat. No. 7,879,759.

(51) Int. Cl.

| B01D 53/56 | (2006.01) |
|---|---|
| B01D 53/86 | (2006.01) |
| B01J 8/00 | (2006.01) |
| B01J 23/00 | (2006.01) |
| B01J 23/10 | (2006.01) |
| B01J 23/32 | (2006.01) |
| B01J 23/70 | (2006.01) |
| B01J 23/72 | (2006.01) |
| B01J 23/08 | (2006.01) |
| C01B 21/00 | (2006.01) |

(52) U.S. Cl.
USPC ........ 423/239.1; 502/350; 502/202; 502/242; 502/324; 502/304; 502/302; 502/309; 502/325; 502/337; 502/338; 502/345; 502/353; 502/355

(58) Field of Classification Search
USPC ................ 502/202, 206, 241, 242, 324, 304, 502/302, 309, 325, 337, 338, 345, 350, 353, 502/355; 423/213.2, 239.1, 237
See application file for complete search history.

(56) References Cited

U.S. PATENT DOCUMENTS

| 4,221,768 A | 9/1980 | Inoue et al. |
|---|---|---|
| 4,833,113 A | 5/1989 | Imanari et al. |
| 4,855,115 A | 8/1989 | Imanari et al. |
| 4,929,586 A | 5/1990 | Hegedus et al. |
| 5,021,392 A | 6/1991 | Daly et al. |
| 5,082,820 A | 1/1992 | Mitsui et al. |
| 5,198,403 A | 3/1993 | Brand et al. |
| 5,430,230 A * | 7/1995 | Mitsui et al. ............ 588/320 |
| 5,684,116 A | 11/1997 | Martl et al. |
| 5,948,723 A | 9/1999 | Sung |
| 5,958,985 A | 9/1999 | Geerlings et al. |
| 6,054,408 A | 4/2000 | Hums et al. |
| 6,391,276 B1 | 5/2002 | Suda et al. |
| 6,511,642 B1 | 1/2003 | Hatanaka et al. |
| 6,703,343 B2 | 3/2004 | Park |
| 6,706,660 B2 | 3/2004 | Park |
| 6,852,665 B2 | 2/2005 | Morikawa et al. |
| 7,093,428 B2 | 8/2006 | LaBarge et al. |
| 7,247,283 B2 | 7/2007 | Hedouin |
| 7,419,718 B2 | 9/2008 | Ogata et al. |
| 8,148,295 B2 * | 4/2012 | Augustine .................. 502/350 |
| 2003/0186805 A1 | 10/2003 | Vanderspurt et al. |
| 2005/0069639 A1 | 3/2005 | Ogata et al. |
| 2005/0137084 A1 | 6/2005 | Krisko et al. |
| 2005/0233899 A1 | 10/2005 | Anzaki et al. |
| 2006/0029535 A1 | 2/2006 | Ott |
| 2006/0084569 A1 | 4/2006 | Augustine et al. |
| 2008/0274876 A1 | 11/2008 | Ott |
| 2008/0279740 A1 | 11/2008 | Augustine et al. |
| 2010/0209323 A1 | 8/2010 | Augustine et al. |

FOREIGN PATENT DOCUMENTS

| CN | 101254464 | 9/2008 |
|---|---|---|
| EP | 0299294 B1 | 5/1992 |
| EP | 0738179 B1 | 4/1999 |
| JP | 2001314763 A | 11/2001 |
| JP | 2003/093880 A | 4/2003 |
| JP | 2006/068663 A | 3/2006 |
| WO | WO 2004/022229 | 3/2004 |
| WO | WO 2007/078435 A1 | 7/2007 |
| WO | WO2008/046921 | 4/2008 |
| WO | WO2010/094021 | 8/2010 |

OTHER PUBLICATIONS

International Search Report and Written Opinion; PCT/US2010/024269; dated Oct. 13, 2010; 6 pages.
International Search Report and Written Opinion; PCT/US2010/033111; dated Jan. 5, 2011; 9 pages.
International Preliminary Report on Patentablility; PCT/US2010/024269; dated Jul. 27, 2011; 5 pages.
International Preliminary Report on Patentability; PCT/US2010/033111; dated Nov. 22, 2011; 3 pages.
Wan, et al. "Preparation of titania-zirconia composite aerogel material by sol-gel combined with superficial fluid drying" Applied Catalysis A: General 277 (2004) 55-59.
Takahashi, et al. "Sulfur durability of NOx storage and reduction catalyst with supports of TiO2, ZrO2, and ZrO2-TiO2", Applied Catalysis B: Environmental 72 (2007) 187-195.

(Continued)

Primary Examiner — Anthony J Zimmer
(74) Attorney, Agent, or Firm — Dunlap Codding, P.C.

(57) ABSTRACT

Low temperature activity of a vanadium-free selective catalytic reduction catalyst is provided by a mixed metal oxide support containing oxides of titanium and zirconium, the support having a promoter deposited on the surface of the mixed metal oxide support, and further having an active catalyst component deposited over the promoter on the mixed metal oxide support surface. Suitable promoters include oxides of silicon, boron, aluminum, cerium, iron, chromium, cobalt, nickel, copper, tin, silver, niobium, lanthanum, titanium, and combinations thereof. Suitable active catalyst components include oxides of manganese, iron and cerium.

27 Claims, No Drawings

OTHER PUBLICATIONS

Mao, et al "Catalytic performance of B2O3/TiO2-ZrO2 for vapor-phase Beckmann rearrangement of cyclohexane oxime: the effect of boria loading", Catalysis Letters vol. 77, No. 1-3, 2001.

Reddy, et al. "Recent Advances on TiO2-ZrO2 Mixed Oxides and Catalysts and Catalyst Supports", Catalysis Reviews, 47:257-296, 2005.

D. Das, et al. Catalysis Letters; vol. 93; No. 3-4; pp. 185-193; 2004.

EP Serial No. 10778094.2; Steven Augustine; Supplementary European Search Report; Feb. 13, 2013; 7 pages.

Taiwan Serial No. 099115139; Search Report; Feb. 20, 2013; 2 pages.

Taiwan Serial No. 099115139; Steven Augustine; Office Action dated Feb. 26, 2013; 7 pages.

* cited by examiner

CATALYST PROMOTERS IN VANADIUM-FREE MOBILE CATALYST

CROSS REFERENCE TO RELATED APPLICATIONS

This present application is a continuation of U.S. Ser. No. 12/468,461 filed May 19, 2009 now U.S. Pat. No. 8,148,295, which is a continuation-in-part of U.S. Ser. No. 12/371,760 filed Feb. 16, 2009 now U.S. Pat. No. 7,879,759, the contents of which are hereby expressly incorporated by reference herein in their entirety.

STATEMENT REGARDING FEDERALLY SPONSORED RESEARCH OR DEVELOPMENT

Not applicable.

BACKGROUND

1. Field of Invention

The invention relates generally to catalysts and methods of making catalysts and, more particularly, but not by way of limitation, to catalysts and methods of making catalysts that are useful for purifying exhaust gases and waste gases from combustion processes.

2. Background of the Invention

The high temperature combustion of fossil fuels or coal in the presence of oxygen leads to the production of unwanted nitrogen oxides ($NO_x$). Significant research and commercial efforts have sought to prevent the production of these well-known pollutants, or to remove these materials prior to their release into the air. Additionally, federal legislation has imposed increasingly more stringent requirements to reduce the amount of nitrogen oxides released to the atmosphere.

Processes for the removal of $NO_x$ formed in combustion exit gases are well known in the art. The selective catalytic reduction (SCR) process is particularly effective. In this process, nitrogen oxides are reduced by ammonia (or another reducing agent such as unburned hydrocarbons present in the waste gas effluent) in the presence of a catalyst with the formation of nitrogen. Effective SCR DeNO$_x$ catalysts include a variety of mixed metal oxide catalysts, including vanadium oxide supported on an anatase form of titanium dioxide (see, for example, U.S. Pat. No. 4,048,112) and titania and at least the oxide of molybdenum, tungsten, iron, vanadium, nickel, cobalt, copper, chromium or uranium (see, for example, U.S. Pat. No. 4,085,193).

A particularly effective catalyst for the selective catalytic reduction of $NO_x$ is a metal oxide catalyst comprising titanium dioxide, divanadium pentoxide, and tungsten trioxide and/or molybdenum trioxide (U.S. Pat. No. 3,279,884). Also, U.S. Pat. Appl. Pub. No. 2006/0084569 (projected U.S. Pat. No. 7,491,676) teaches a method of producing an improved catalyst made of titanium dioxide, vanadium oxide and a supported metal oxide, wherein the titania supported metal oxide has an isoelectric point of less than or equal to a pH of 3.75 prior to depositing the vanadium oxide.

Vanadium and tungsten oxides supported on titania have been standard catalyst compositions for $NO_x$ reduction since its discovery in the 1970's. In fact, very few alternatives rival the catalytic performance of vanadium and tungsten oxides supported on titania. Despite the performance advantages of vanadium and tungsten oxides supported on titania, it would be advantageous to replace tungsten and/or vanadium with alternative metal components due to the significant drawbacks with using both tungsten and vanadium in SCR catalysts. First, tungsten shortages have led to increased costs associated with its use. Second, the potential toxicity of vanadium oxide has led to health concerns regarding its use in selective catalytic reduction DeNO$_x$ catalysts for mobile applications, as well as significant costs associated with disposal of spent catalysts.

It is known in the art that iron-supported on titanium dioxide is an effective selective catalytic reduction DeNO$_x$ catalyst (see, for example, U.S. Pat. No. 4,085,193). However, the limitations to using iron as an alternative are its lower relative activity and, by comparison, a high rate of oxidation of sulfur dioxide to sulfur trioxide (see, for example, Canadian Pat. No. 2,496,861). Another alternative being proposed is transition metals supported on beta zeolites (see for example, U.S. Pat. Appl. Pub. No. 2006/0029535). The limitation of this technology is the high cost of zeolite catalysts, which can be a factor of 10 greater than comparable titania supported catalysts.

For implementation of lean burn engine technologies, the SCR DeNO$_x$ catalyst used should have the capability of achieving very high reduction of $NO_x$ over a broad range of temperatures. However, most catalysts for lean burn applications exhibit satisfactory performance over only a fairly narrow temperature range. Much of the $NO_x$ released from mobile sources equipped with existing $NO_x$ control technology occurs immediately after starting the engine due to low exhaust temperatures and poor low temperature catalyst performance.

The kinetics of $NO_x$ reduction are believed to be optimized when about 50% of the nitrogen is present as $NO_2$. At low exhaust temperatures, oxidation catalysts upstream of the SCR DeNO$_x$ catalyst do not convert sufficient quantities of $NO_x$ to $NO_2$ to provide the desired 50%. Most DeNO$_x$ catalysts are also not capable of oxidizing of $NO_x$ to $NO_2$ at low temperatures, and are very inefficient at $NO_x$ reduction at 250° C. and below. Therefore, SCR DeNO$_x$ catalysts having improved low temperature activity are the focus of considerable research.

There remains a need for catalysts that exhibit improved performance for selective catalytic reduction of $NO_x$ in the presence of ammonia at temperatures of 200° C. to 300° C. and below. SCR DeNO$_x$ catalysts containing manganese oxides have been proposed to improve low temperature activity. To this end it is desirable to further improve the conversion activity of manganese containing SCR DeNO$_x$ catalysts at temperatures of about 200° C. to 300° C. and below.

SUMMARY OF THE INVENTION

The present invention is directed to a catalyst composition having a mixed metal oxide support containing oxides of titanium and zirconium, and having a mixed metal oxide support surface on which is deposited a promoter selected from the group consisting of oxides of silicon, boron, aluminum, cerium, iron, chromium, cobalt, nickel, copper, tin, silver, niobium, lanthanum, titanium, and combinations thereof, thus providing a promoter-rich support surface. An active catalyst component is deposited on the promoter-rich support surface, the active catalyst component being an oxide of manganese, iron, cerium or combinations thereof.

In one embodiment, a vanadium-free catalyst is provided for selective catalytic reduction of nitrogen oxide with ammonia. The catalyst includes a mixed metal oxide support comprising oxides of titanium and zirconium, a promoter deposited on the mixed metal oxide support surface to form a promoter-rich mixed metal oxide support surface, and an outer layer of manganese oxide on the promoter-rich mixed metal oxide support surface. The molar ratio of titanium oxide to zirconium oxide in the mixed metal oxide support is in a range of from about 70:30 to about 85:15. The promoter is an oxide of boron and/or silicon, and is present in a range of from about 0.1 wt % to about 2 wt % of the mixed metal oxide support. The outer layer of manganese oxide on the promoter-rich mixed metal oxide support surface is present in an amount in a range of from about 0.005 g to about 0.2 g manganese per g of the mixed metal oxide support.

A method of making a catalyst for selective catalytic reduction of nitrogen oxide is also provided. The method includes the following steps. A mixed metal oxide support comprising titanium oxide and zirconium oxide is provided. The mixed metal oxide support is contacted with promoter precursors such that a promoter is deposited on the surface of the mixed metal oxide support surface to form a promoter-rich mixed metal oxide support surface. Suitable promoters include oxides of boron, silicon, aluminum, cerium, iron, chromium, cobalt, nickel, copper, tin, silver, niobium, lanthanum, titanium, and combinations thereof. The promoter is present in a range of from about 0.01 wt % to about 15 wt % of the mixed metal oxide. An outer layer of an active catalyst component is deposited on the promoter-rich mixed metal oxide support surface. The active catalyst component is manganese oxide, iron oxide, and/or cerium oxide, and is deposited in an amount in a range of from about 0.005 g to about 0.2 g active catalyst per g of the mixed metal oxide support.

In another embodiment, a method is provided for improving the low temperature conversion activity of manganese-containing mixed metal oxide catalysts used for selective catalytic reduction of nitrogen oxides with ammonia. The method includes providing a mixed metal oxide support comprising titanium oxide and zirconium oxide and depositing the promoter and manganese oxide onto the surface of the mixed metal oxide as described above. The quantities of promoter and manganese oxide deposited are controlled to provide desired levels of low temperature catalytic activity.

In yet another embodiment, a method is provided for selective reduction of nitrogen oxides with ammonia, wherein the nitrogen oxides are present in a gas stream. The method includes contacting the gas stream with ammonia in the presence of a catalyst, wherein the catalyst is provided as described above.

Thus, utilizing (1) the technology known in the art; (2) the above-referenced general description of the presently claimed and/or disclosed inventive process(es), methodology (ies), apparatus(es) and composition(s); and (3) the detailed description of the invention that follows, the advantages and novelties of the presently claimed and/or disclosed inventive process(es), methodology(ies), apparatus(es) and composition(s) would be readily apparent to one of ordinary skill in the art.

DETAILED DESCRIPTION OF THE INVENTION

Before explaining at least one embodiment of the invention in detail, it is to be understood that the invention is not limited in its application to the details of construction, experiments, exemplary data, and/or the arrangement of the components set forth in the following description. The invention is capable of other embodiments or of being practiced or carried out in various ways. Also, it is to be understood that the terminology employed herein is for the purpose of description and should not be regarded as limiting.

There is a need for new technologies having the capability of achieving very high reduction of $NO_x$ from lean burn engines at low operating temperatures around 250° C. As mentioned above, it is known that catalytically active metal or metalloid oxides such as manganese oxide can be a critical component for good low temperature $DeNO_x$ conversion utilizing a vanadium-free catalyst; however, there is significant room for further improvement. Surprisingly, it has been discovered that the low temperature activity for $NO_x$ can be improved by the addition of certain promoters. While promoter techniques have been proposed to modify zeolite-based catalysts, there has been no proposal or suggestion to add promoters to the underlying surface of a vanadium-free mixed metal oxide SCR catalyst. Nor is it obvious that promoters exist that could, upon addition to a manganese, iron or cerium-containing vanadium-free mixed oxide catalyst, improve activity of that catalyst.

Specifically, it has been discovered that improved low temperature activity, can be achieved by providing a catalyst composition having a mixed metal oxide support containing oxides of titanium and zirconium, and having a mixed metal oxide support surface on which is deposited: (a) one or more metal oxide(s) or metalloid oxide(s), referred to herein and in the appended claims as "promoter(s)," wherein the promoter is selected from the group consisting of oxides of silicon, boron, aluminum, cerium, iron, chromium, cobalt, nickel, copper, tin, silver, niobium, lanthanum, titanium, and combinations thereof, and (b) an active catalyst component. Suitable active catalyst components include, but are not limited to, oxides of manganese, iron and cerium. Preferably, the active catalyst component is manganese oxide.

Preferably, the titanium and zirconium mixed metal oxide support is essentially free of vanadium. When referring to the mixed metal oxide support composition, the phrase "essentially free from vanadium" is used herein and in the appended claims to mean less than 0.1% vanadium or that the mixed metal oxide support contains no vanadium or only low levels of vanadium that do not significantly contribute to the catalytic activity of the catalysts. The phrase "low temperature activity" refers herein, and in the appended claims, to "NO conversion efficiency of an SCR $DeNO_x$ catalyst at temperatures in the range of from about 200° C. to about 300° C.," the low temperature range for mobile SCR $DeNO_x$ applications.

In a preferred embodiment, the mixed oxide support consists primarily of titanium and zirconium oxides. The molar ratio of titanium oxide to zirconium oxide can be any range known to those skilled in the art including, but not limited to, a range of from about 60:40 to about 90:10. In one embodiment, the molar ratio of titanium oxide to zirconium oxide is in a range of from about 70:30 to about 85:15.

In some embodiments, the mixed oxide support has a crystalline inner core surrounded by an amorphous metal oxide shell. The crystalline inner core can vary between anatase, rutile and a mixed oxide phase that is 2:1 Ti:Zr called srilankite. The mixed metal oxide support surface is typically an amorphous outer shell that appears to be enriched in zirconium. In some instances titanium oxide is deposited on the mixed metal oxide support surface to insure that the titanium is located at the outer surface of the amorphous outer shell. The amount of titanium oxide deposited on the mixed metal oxide support surface can vary widely. In one embodiment, the amount of titanium oxide deposited on the mixed metal oxide support surface is in a range of from about 0 wt % to about 10 wt % of the mixed metal oxide support.

The promoter is present on the mixed metal oxide support surface in an amount in a range of from about 0.01 wt % to about 15 wt %, providing a promoter-rich support surface. The promoter can be any metalloid, transition metal, or lanthanide metal. Nonlimiting examples of suitable promoters include oxides of silicon, boron, aluminum, cerium, iron, chromium, cobalt, nickel, copper, tin, silver, niobium, lanthanum, titanium. Preferably, the promoter is environmentally benign.

In one embodiment, the promoter is silicon oxide and is present on the mixed metal oxide support surface in an amount in the range of from about 0.1 wt % to about 15 wt % of the mixed metal oxide support. In another embodiment, the promoter is boron oxide and is present on the mixed metal oxide support surface in an amount in the range of from about 0.01 wt % to about 1 wt % of the mixed metal oxide support.

In preferred embodiments, the active catalytic component is manganese oxide and is present on the promoter-rich support surface in an amount sufficient to achieve improved low temperature activity. Suitable amounts of manganese oxide include, but are not limited to, an amount in the range of from about 0.5 mol % to about 20 mol % of the mixed oxide support, and preferably an amount in the range of from about 1 mol % to about 10 mol % of the mixed oxide support. The term "mol % of the mixed oxide support" is defined as the number of moles divided by the moles of metal oxide in the mixed metal oxide support. So, for example, if 5 moles of manganese are deposited onto a mixed metal oxide support consisting of 80 moles of $TiO_2$ and 20 moles of $ZrO_2$, the manganese oxide is present in an amount of 5/(80+20) or 5 mol %.

A method of making the above-described catalyst for selective catalytic reduction of nitrogen oxides is also provided. The method includes the steps of: (a) providing a mixed metal oxide support; (b) depositing a promoter on the mixed metal oxide support surface to form a promoter-rich support surface; and (c) depositing manganese oxide on the promoter-rich support surface.

In one embodiment, the mixed metal oxide support is provided by precipitating titanium and zirconium from an aqueous solution. Precipitation of the mixed metal oxide support is achieved by mixing titanium and zirconium precursors in water, or by mixing solutions of dissolved titanium and dissolved zirconium, in any order. Preferably, soluble salts of titanium or zirconium are used. Nonlimiting examples of titanium salts include titanium sulfate, titanium chloride, titanium oxychloride, and titanium nitrate. Similarly, nonlimiting examples of zirconium salts include zirconium sulfate, zirconium chloride, zirconium perchlorate and zirconium nitrate. Titanium and zirconium are precipitated from solution by adjusting the pH to, for example, a pH between about 5 to 10, to precipitate a mixture of titanium and zirconium oxides, hydroxides and hydrated oxides, hereinafter referred to as a mixed metal oxide precipitate. The composition of the mixed metal oxide precipitate can vary widely and can be controlled by controlling the ratio of titanium to zirconium salts added. For example, the molar ratio of titanium to zirconium salts added to the aqueous solution is typically within a range of from about 60:40 to about 90:10 and complete precipitation results in a corresponding molar ratio of $TiO_2$: $ZrO_2$ in the mixed metal oxide within the range of from about 60:40 to about 90:10. In one embodiment, the molar ratio of $TiO_2:ZrO_2$ in the mixed metal oxide is within the range of from about 70:30 to about 85:15.

During precipitation of the mixed metal oxide, the solution or slurry is stirred using means well known to persons of ordinary skill in the art. Unless otherwise specified or indicated by context, the terms "slurry" and "solution" are used interchangeably and include solutions, suspensions and slurries, as well as any other combination of substances as liquid or colloidal media.

In some embodiments, following the initial precipitation of the mixed metal oxide precipitate, the pH control is removed and additional titanium is deposited onto the surface of the mixed metal oxide precipitate (also referred to as the mixed metal oxide support surface) from an aqueous solution containing additional dissolved titanium. The additional dissolved titanium can be added to the same slurry or the mixed metal oxide precipitated can be added to a fresh solution containing the additional dissolved titanium. As with the initial precipitation of the mixed metal oxide precipitate, the additional dissolved titanium can be prepared using titanium salts, nonlimiting examples of which include titanium sulfate, titanium chloride, titanium oxychloride, and titanium nitrate compound. The amount of titanium oxide deposited can vary widely, and in some embodiments is in a range of from about 0 wt % to about 10 wt % of the mixed metal oxide precipitate.

Deposition of the promoter onto the surface of the mixed metal oxide precipitate is achieved by addition of a promoter precursor (also referred to herein as a soluble promoter-containing compound) to the mixed metal oxide slurry. The term "deposit" and its related forms are used herein and in the appended claims to include impregnation, adsorption, ion exchange, precipitation and deposition processes and mechanisms generally resulting in formation of a promoter-rich layer or coating. The pH is allowed to change with the addition of the soluble promoter-containing compound, i.e. the pH is no longer controlled by addition of, for example, ammonium hydroxide. If the selected promoter is an oxide of silicon, suitable silicon-containing compounds include, but are not limited to, tetraethyl ammonium silicate, tetramethyl ammonium silicate, tetraethyl orthosilicate, tetramethyl orthosilicate, alkali sililcates, alkaline earth silicates, and silicic acid. If the selected promoter is an oxide of boron, suitable boron-containing compounds include, but are not limited to, boron nitrate, boric acid, boracic acid, and boron chloride. During and after addition of the soluble promoter-containing compound, the slurry is typically stirred using means well known to those skilled in the art.

The promoter-coated mixed metal oxide precipitate is separated from the aqueous solution using any conventional technique for solid-liquid separation, such as filtration, decanting, draining or centrifuging, and the separated precipitate is washed with, for example, deionized water to remove soluble ions from the precipitate. The precipitate is then dried to remove water. For the drying of this material, any temperature that is effective for removing moisture may be used. Preferably, greater than 95% or greater than 98% of the free moisture is removed. Methods and equipment for drying solids are well known to persons of ordinary skill in the art. In the laboratory, for example, the filter cake is dried in a laboratory drying oven for about 16 hours at about 100° C.

After drying, the promoter-coated mixed metal oxide precipitate is slurried in water and a soluble precursor of the active catalyst component is added to the slurry. Preferably, the active catalyst component is an oxide of manganese, iron or cerium. Any soluble active catalyst precursor can be used. For example, suitable manganese salts include, but are not limited to, manganese sulfate, manganese acetate, manganese chloride, and the like. Preferably, one mixes the mixed metal oxide and the soluble active catalyst precursor for a time and at a temperature sufficient to allow the desired adsorption of the active catalyst onto the mixed metal oxide support. In one embodiment, the mixed metal oxide and a soluble manganese compound are mixed for about 30 to 90 minutes after raising the temperature of the slurry to a range of from about 40° C. to about 65° C. Such times and temperatures can vary depending on operating conditions such as slurry concentration, etc.

The amount of active catalyst component deposited onto the mixed metal oxide support surface can also vary. Typically, the active catalyst precurser is added in quantities sufficient to achieve, when deposited on the support surface, improved low temperature activity. For example, using a manganese catalyst, suitable amounts of manganese include, but are not limited to, an amount in the range of from about 0.5 mol % to about 20 mol % of the mixed metal oxide support.

Following deposition of the active catalyst component, the slurry is filtered and the filtered solids are dried. As discussed above, methods for filtering and drying are well known to persons of ordinary skill in the art. After drying, the solids are calcined. Typically, the solids are calcined for a time in the range of from about 1 to 8 hours at a calcining temperature in a range of from about 400° C. to about 700° C. For example, the solids can be calcined for about 6 hours at about 600° C.

The resulting catalyst, as described above or as obtained from the process described above, is in the form of a powder, but it can also be shaped into granules, beads, cylinders or honeycombs of various dimensions. The catalyst can be applied to other supports that are routinely used in the catalysis field, such as alumina or silica. The catalyst can also be used in catalytic systems comprising a wash coat based on the catalyst and applied to a substrate that is, for example, a metallic or ceramic monolith.

The resulting catalyst composition may have many applications; however, these catalysts offer significant advantages for SCR DeNO$_x$ applications, and are particularly suitable for the treatment of exhaust gas from automobile internal combustion engines (sometimes referred to as mobile applications). To this end, the invention also concerns the use of a catalytic composition, as described above or as obtained by the processes described above, for selective reduction of nitrogen oxides with ammonia, wherein the nitrogen oxides are present in a gas stream such as an automobile post combustion exhaust gas.

In order to further illustrate the present invention, the following examples are given. However, it is to be understood that the examples are for illustrative purposes only and are not to be construed as limiting the scope of the invention.

COMPARATIVE EXAMPLE 1

The following test was run to confirm that the presence of small amounts of silicon at the surface of a mixed oxide promotes the low temperature activity of supported Mn. The support was prepared by co-precipitating titanium and zirconium hydroxides followed by washing and drying. Manganese salts were then deposited on the support, and it was calcined at 600° C. prior to reactor testing.

The precipitation was done by mixing titanium and zirconium salts dissolved in water with concentrated ammonium hydroxide at a controlled pH. The salts used were titanium sulfate and chloride; and zirconium nitrate and sulfate. The pH was controlled at 8.5. The support material was prepared by first making a solution of titanyl sulfate and zirconyl sulfate by mixing 765.1 grams of a TiOSO$_4$ solution (10.4 wt % as TiO$_2$) with 419.2 grams of a ZrOSO$_4$ solution (7.5 wt % as ZrO$_2$) in a 1 liter vessel for 10 minutes. Solutions of titanium oxychloride and zirconium oxychloride can also be used to replace the respective oxysulfate solutions. Co-precipitation was carried out by adding the first solution at a rate of 20 mL/min to a continuously stirred tank reactor while simultaneously adding concentrated ammonium hydroxide to maintain the pH at 8.5. The pH can range from 5.0 to 9.0. The mixing vessel was stirred at 450 revolutions per minute (rpm) using a standard mixer until precipitation initiated and the viscosity increased. Once precipitation began, the mixing rate was increased to 550 rpm. Product formed during the early states of mixing was discarded. After steady state was established, the product effluent was collected in a separate vessel that was also stirred continuously to give a support material of 79.6 mol % TiO$_2$ and 20.4% ZrO$_2$. Prior to using the support for making a catalyst, it was washed with deionized water to a conductivity of less than 1.0 mS/cm and the filtered. The resulting filter cake was dried in an oven for 16 hours at 100° C. to provide the porous support material.

Transmission electron micrographs suggest that these particles are comprised of a crystalline inner core surrounded by amorphous metal oxide. X-ray diffraction (XRD) results show that the crystalline core can vary between anatase, rutile and a mixed oxide phase that is 2:1 Ti:Zr called srilankite. The amorphous outer layer appears to be enriched in Zr.

EXAMPLE 1a

A silica modified support was prepared in the same manner as that described in Comparative Example 1, but prior to washing, a second solution containing titanyl sulfate and tetramethyl ammonium silicate are added to the slurry. The second solution was prepared by adding 7 ml of tetramethyl ammonium silicate (10.7% w/v as SiO$_2$) to 84 g of titanyl sulfate solution (10.4 wt % as TiO$_2$) and mixing for 10 minutes. The solution was then added to the reaction vessel in order to selectively deposit SiO$_2$ and TiO$_2$ at the surface of the mixed metal oxide. The material was then aged for 25 minutes and filtered. The filter cake was washed with deionized water to a conductivity of less than 1.0 mS/cm and then filtered. The composition of the resulting material was 80.5 mol % TiO$_2$, 18.6 mol % ZrO$_2$, and 0.9 mol % SiO$_2$.

EXAMPLE 1b

A second support was made using the same method as that described in Example 1a with the exception that the second solution added to the reaction vessel contained 3.5 ml of tetramethyl ammonium silicate (10.7% w/v as SiO$_2$) and 42 g of titanyl sulfate solution (10.4 wt % as TiO$_2$) to give a nominal composition of 80.0 mol % TiO$_2$, 19.5 mol % ZrO$_2$, and 0.5 mol % SiO$_2$.

10 g of the dried solids as prepared above were further slurried in 60 ml water along with 8.37 g of manganese acetate tetrahydrate to provide a loading of 6 wt % manganese on the support material. Any soluble manganese salt, such as the manganese sulfates or manganese nitrates, could be used. The temperature of the slurry was raised to 60° C. and the slurry was mixed for 1 hour to allow absorption of manganese on the support. The solids were then filtered and again dried at 100° C. for at least 6 hours followed by calcination at 600° C. for 6 hours.

The catalyst was tested in the powder form without further shaping. A ⅜" quartz reactor holds 0.1 g catalyst supported on glass wool. The feed composition was 1,000 ppm of NO, 1,000 ppm of NH$_3$, 5% O$_2$, 3% H$_2$O, and balance N$_2$. NO conversion was measured at 250° C. and 350° C. at atmospheric pressure. The results are summarized in Table 1 below. By comparing samples prepared according to Comparative Example 1 with Examples 1a and 1b, one can see that in the two cases where silicon is included in the catalyst preparation, the conversion for NO increases at both 250° C. and 350° C., and the effect is greater as the silicon composition is increased. The improvement in the NOx removal rate ranges from 33% to 67%.

TABLE 1

Results of Si Promotion of
Manganese in Vanadium-Free Mobile Catalyst

| | | | Rxn Temp | | | |
|---|---|---|---|---|---|---|
| | | Composition | 250° C. | | 350° C. | |
| Catalyst | Sample | $TiO_2:ZrO_2:SiO_2$ (%) | NO Conversion | $DeNO_x$ Rate | NO Conversion | $DeNO_x$ Rate |
| 6310-91 | Comparative Example 1 | 79.6:20.4:0 | 29.7 | 0.4 | 51.7 | 0.7 |
| 6320-30 | Comparative Example 1 | 79.6:20.4:0 | 27.0 | 0.3 | 44.6 | 0.6 |
| 6320-32 | Example 1a | 80.5:18.6:0.9 | 45.1 | 0.6 | 65.9 | 1.1 |
| 6320-33 | Example 1b | 80.0:19.5:0.5 | 36.4 | 0.5 | 57.2 | 0.8 |

EXAMPLE 2

In another series of tests, a mixed metal oxide support was prepared, as in Example 1, by mixing titanium and zirconium salts dissolved in water with concentrated ammonium hydroxide at a controlled pH. The salts used were titanium sulfate and chloride; and zirconium nitrate and sulfate. The pH was controlled at 8.5 and the $TiO_2:ZrO_2$ molar ratio used was 80:20. After precipitation of the $TiO_2$ $ZrO_2$ support and removal of pH control, 0.75 wt % B was added as boron nitrate. Again, the material was filtered and washed to remove spectator ions, as determined by conductivity measurements of the wash filtrate at or below 1 mS/cm, and the filter cake was dried for at least 16 hours at 100° C.

As in Example 1, the dried solids were slurried in water containing a soluble manganese salt, manganese sulfate or manganese acetate, to provide 6 wt % Mn on the mixed oxide support solids. Ammonium bicarbonate was added to the slurry to ensure full deposition of Mn. The temperature of the slurry is raised to 60° C. and mixed for 1 hour to allow absorption of manganese on the support. The solids are then filtered and again dried at 100° C. for at least 16 hours followed by calcination at 600° C. for 6 hours.

The resulting catalyst samples were tested as described in Example 1, and the results are summarized in Table 2 below. For samples containing boron, the improvement in $NO_x$ conversion goes through a maximum according to the concentration in the sample. Of the samples tested, the maximum exists at or around 0.19 wt % B.

TABLE 2

Results of B Promoted 6% Mn Deposited on an
80:20 $TiO_2:ZrO_2$ Mixed Oxide Support

| | | Rxn Temp | 250° C. | | 350° C. | |
|---|---|---|---|---|---|---|
| Catalyst | Nominal Loading of B Promoter | | NO Conversion | $DeNO_x$ Rate | NO Conversion | $DeNO_x$ Rate |
| 6320-29 | 0.125% | | 28.4 | 0.3 | 56.8 | 0.8 |
| 6320-31 | 0.19% | | 36.9 | 0.5 | 64.8 | 1.0 |
| 6320-23 | 0.25% | | 28.4 | 0.3 | 62.3 | 1.0 |
| 6320-24 | 0.75% | | 20.8 | 0.2 | 38.0 | 0.5 |

From the above examples and descriptions, it is clear that the present inventive process(es), methodology(ies), apparatus(es) and composition(s) are well adapted to carry out the objects and to attain the advantages mentioned herein as well as those inherent in the presently provided disclosure. While presently preferred embodiments of the invention have been described for purposes of this disclosure, it will be understood that numerous changes may be made which will readily suggest themselves to those skilled in the art and which are accomplished within the spirit of the presently claimed and disclosed inventive process(es), methodology(ies), apparatus(es) and composition(s) described herein.

What is claimed is:

1. A catalyst composition comprising:
   a mixed metal oxide support containing oxides of titanium and zirconium and having a mixed metal oxide support surface;
   a promoter selected from the group consisting of oxides of silicon, boron, aluminum, cerium, iron, chromium, cobalt, nickel, copper, tin, silver, niobium, lanthanum, titanium, and combinations thereof, wherein the promoter is deposited on the mixed metal oxide support surface prior to any calcination of the mixed metal oxide support surface, providing a promoter-containing support surface; and
   an active catalyst component selected from the group consisting of oxides of manganese, iron and cerium, the active catalyst component deposited on the promoter-containing support surface prior to any calcination of the promoter-containing support surface.

2. The catalyst composition of claim 1, wherein the mixed metal oxide support consists essentially of oxides of titanium and zirconium, the promoter is present in an amount of from about 0.01 wt % to about 15 wt % of the mixed metal oxide, and the active catalyst component consists essentially of manganese oxide.

3. The catalyst composition of claim 1, wherein the mixed metal oxide support is essentially free from vanadium.

4. The catalyst composition of claim 3, wherein the molar ratio of titanium oxide to zirconium oxide in the mixed metal oxide support is in the range of from about 60:40 to about 90:10.

5. The catalyst composition of claim 3, wherein the mixed metal oxide support has a crystalline inner core surrounded by an amorphous metal oxide shell.

6. The catalyst composition of claim 5, wherein the crystalline inner core comprises an oxide selected from the group consisting of anatase, rutile, srilankite, and mixtures thereof, and wherein the promoter is present in an amount of from about 0.01 wt % to about 15 wt % of the mixed metal oxide.

7. The catalyst composition of claim 6, wherein the amorphous metal oxide shell is enriched in zirconium relative to the crystalline inner core.

8. The catalyst composition of claim 6, wherein titanium is deposited on an outer portion of the amorphous metal oxide shell to form a titanium-containing mixed metal oxide support surface.

9. The catalyst composition of claim 6, wherein the mixed metal oxide support surface consists essentially of an outer portion of the amorphous metal oxide shell.

10. The catalyst composition of claim 1, wherein the promoter is silicon oxide.

11. The catalyst composition of claim 1, wherein the promoter is boron oxide.

12. A method of making a catalyst for selective catalytic reduction of nitrogen oxide, the method comprising the following steps:

contacting a mixed metal oxide support with promoter precursors, the mixed metal oxide support containing titanium oxide and zirconium oxide and having a surface, thereby depositing the promoter on the mixed metal oxide support surface, prior to any calcination of the mixed metal oxide support surface, to form a promoter-containing support surface, the promoter selected from the group consisting of oxides of boron, silicon, aluminum, cerium, iron, chromium, cobalt, nickel, copper, tin, silver, niobium, lanthanum, titanium, and combinations thereof, the promoter present in a range of from about 0.01 wt % to about 15 wt % of the mixed metal oxide; and depositing an outer layer of an active catalyst component onto the promoter-containing support surface, prior to any calcination of the promoter-containing support surface, wherein the active catalyst component is selected from the group consisting of manganese oxide, iron oxide and cerium oxide, and the active catalyst component is present in an amount in a range of from about 0.05 mol % to about 20 mol % of the mixed metal oxide support.

13. The method of claim 12, wherein the promoter contains silicon oxide and the active catalyst component is manganese oxide.

14. The method of claim 12, wherein the mixed metal oxide support is prepared by precipitating titanium and zirconium from an aqueous solution.

15. The method of claim 12 wherein the mixed metal oxide support is provided by precipitating titanium and zirconium oxides from an aqueous solution containing dissolved titanium and zirconium, wherein the precipitation is encouraged by increasing the pH to a range of from about 5 to about 10, and wherein the resulting mixed metal oxide has a TiO2:ZrO2 molar ratio in a range of from about 70:30 to about 85:15.

16. The method of claim 14, further comprising the step of depositing titanium onto the mixed metal oxide support surface from an aqueous solution containing a dissolved compound selected from the group consisting of titanyl sulfate, titanyl chloride, titanium tetrachloride, titanium oxalate, titanium tetraiodide and mixtures thereof.

17. The method of claim 16 wherein titanium is deposited in an amount in a range of from about 0.1 wt % to about 10 wt % of the mixed metal oxide support.

18. The method of claim 14, wherein the promoter is an oxide of silicon and the silicon oxide is deposited onto the mixed metal oxide support surface from an aqueous solution containing a soluble silicon compound.

19. The method of claim 18, wherein the soluble silicon compound is selected from the group consisting of tetramethyl ammonium silicate, tetramethyl ammonium silicate, tetraethyl orthosilicate, tetramethyl orthosilicate, alkali sililcates, alkaline earth silicates, and silicic acid.

20. The method of claim 14, further comprising the step of depositing titanium onto the mixed metal oxide support surface from an aqueous solution containing a dissolved titanium-containing compound to form a titanium-containing mixed metal oxide support surface, and wherein the step of depositing a promoter comprises depositing silicon oxide onto the titanium-containing mixed metal oxide support surface from an aqueous solution containing a soluble silicon compound.

21. The method of claim 20, wherein the titanium-containing compound is selected from the group consisting of titanyl sulfate, titanyl chloride, titanium tetrachloride, titanium oxalate, titanium tetraiodide and mixtures thereof.

22. The method of claim 14, wherein the promoter is an oxide of boron and the boron oxide is deposited onto the mixed metal oxide support surface from an aqueous solution containing a soluble boron compound.

23. The method of claim 22, wherein the soluble boron compound is selected from the group consisting of boron nitrate, boric acid, boracic acid, and boron chloride.

24. A method for improving the low temperature conversion activity of manganese-containing mixed metal oxide catalysts used for selective catalytic reduction of nitrogen oxides with ammonia, the method comprising:

providing a mixed metal oxide support containing titanium oxide and zirconium oxide; and depositing a promoter onto a surface of the mixed metal oxide support, prior to any calcination of the mixed metal oxide support surface, the promoter selected from the group consisting of oxides of silicon, boron, aluminum, cerium, iron, chromium, cobalt, nickel, copper, tin, silver, niobium, lanthanum, titanium, and combinations thereof, thereby forming a promoter-containing mixed metal oxide support surface; and depositing manganese oxide onto the promoter-containing mixed metal oxide support surface prior to any calcination of the promoter-containing mixed metal oxide support surface;

wherein the quantities of promoter and manganese oxide deposited are controlled to provide low temperature catalytic activity.

25. The method of claim 24, wherein the promoter contains silicon oxide.

26. A method for selective reduction of nitrogen oxides with ammonia, wherein the nitrogen oxides are present in a gas stream, the method comprising:

contacting the gas stream with ammonia in the presence of a catalyst, the catalyst comprising:

a mixed metal oxide support containing oxides of titanium and zirconium; and a promoter selected from the group consisting of oxides of silicon, boron, aluminum, cerium, iron, chromium, cobalt, nickel, copper, tin, silver, niobium, lanthanum, and combinations thereof, the promoter deposited on a surface of the mixed metal oxide support, prior to any calcination of the mixed metal oxide support surface, to provide a promoter-containing mixed metal oxide support surface; and an active catalyst component deposited on the promoter-containing mixed metal oxide support surface prior to any calcination of the promoter-containing mixed metal oxide support surface, wherein the active catalyst component is selected from the group consisting manganese oxide, iron oxide and cerium oxide.

27. The method of claim 26, wherein the promoter contains silicon oxide and the active catalyst component is manganese oxide.

* * * * *